Thomas R. Stockton
INVENTOR.

BY John R. Faulkner
Robert E. McCallum
ATTORNEYS.

United States Patent Office 3,333,486
Patented Aug. 1, 1967

3,333,486
TRANSMISSION
Thomas R. Stockton, Northville, Mich., assignor to Ford Motor Company, Dearborn, Mich., a corporation of Delaware
Filed Dec. 1, 1964, Ser. No. 415,124
4 Claims. (Cl. 74—677)

This invention relates to an automatic transmission construction. More particularly, it relates to a combined hydraulic-mechanical transmission providing a number of forward speed drives, a reverse drive, neutral, and engine braking.

One of the objects of the invention is to provide an automatic transmission that is simple in construction, has relatively few parts, and is efficient in operation.

Another object of the invention is to provide a transmission consisting simply of a hydraulic torque converter and a single planetary gearset, the torque converter, however, having a number of pivotally mounted turbine-stator vanes that can be rotated to various positions in accordance with operating conditions to obtain a maximum efficiency of operation of the converter and gearset at all times.

A further object of the invention is to provide a transmission as described above in which the pivoting of the turbine-stator elements causes them to act: in one position as a stator member to establish torque multiplication through the converter; in another position as a freely floating member to permit a full gear ratio carry-out during a reduction drive through the gearset; in another position as a turbine to provide a split torque drive of the gearset above converter coupling speeds and to provide engine braking below coupling speeds during a coast operation of the vehicle; and in a further position as a fluid circulation blocking member to block flow of fluid through the converter.

Figure 1:
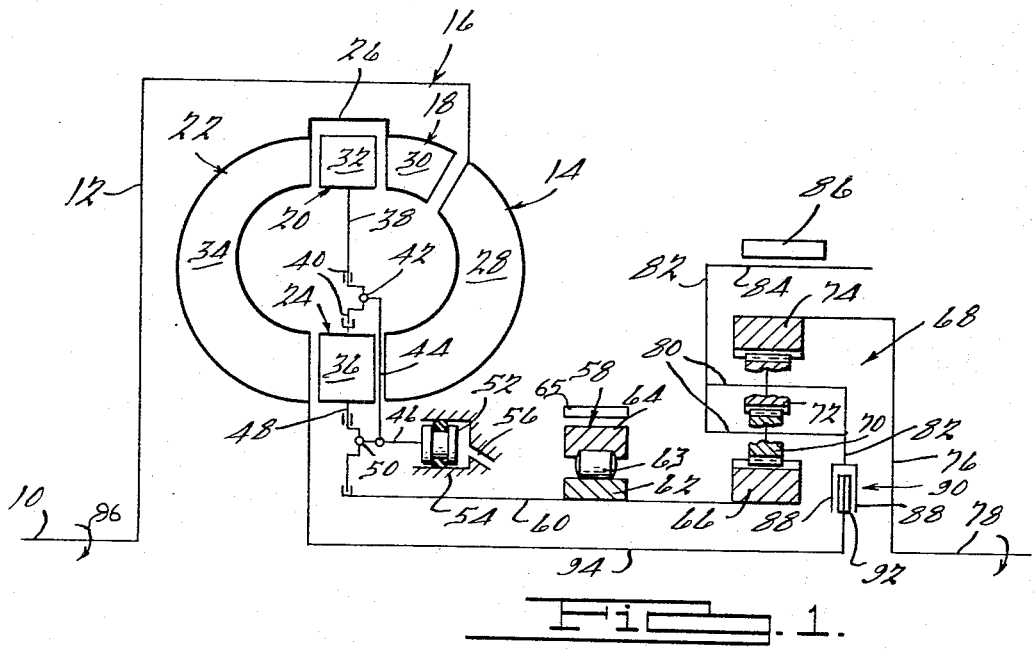
Figure 2:
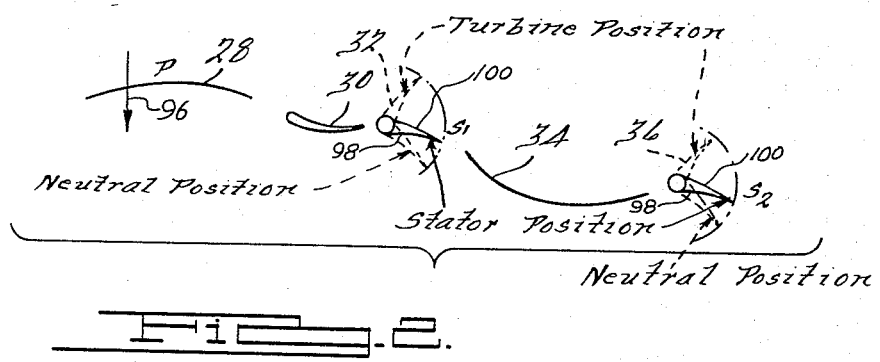

Other objects, features and advantages will become apparent upon reference to the succeeding, detailed description of the invention and to the drawings illustrating the preferred embodiment thereof; wherein, FIGURE 1 illustrates schematically a cross-sectional view of one-half of a transmission embodying the invention; and, FIGURE 2 illustrates schematically a linear projection of the fluid inlet and exit portions of the blades of the converter of FIGURE 1.

FIGURE 1 shows a transmission having a power input shaft 10 that is adapted to be connected to any suitable source of power, such as, for example, an internal combustion engine for a motor vehicle. Shaft 10 is drivingly connected by an annular shell or cover 12 to the outer shroud of a fluid impeller or pump 14. The pump constitutes one element of a hydraulic torque converter 16. The converter includes a first turbine 18, a first turbine-stator 20, a second turbine 22, and a second turbine-stator 24.

Each of the members of converter 16 are constructed in a similar manner, having inner and outer annular shrouds enclosing circumferentially spaced blades 28, 30, 32, 34 and 36. The cross-sectional shapes of these blades are shown in FIGURE 2. The outer and inner shrouds of all of the cooperating members together define a toroidal path for the counterclockwise circulation of fluid from pump 14 to turbine 22 and back again in a known manner to provide torque multiplying and fluid coupling phases of operation of converter 16.

As seen in FIGURE 1, first and second turbines 18 and 22 are rigidly connected by a cross-over member 26. The first and second turbine-stator members 20 and 24 are also connected, and can be pivoted to any one of four different positions for purposes to be described later.

Turbine-stator blades 32 are fixed to a shaft 38 that is rotatably mounted on the housing in spaced bearing or guide members 40. Shaft 38 is provided with an offset crank arm 42 that is pivotally connected to an actuating link 44. Link 44 is pivotally connected at its opposite end to a piston rod 46. Turbine-stator blades 36 are fixed to a shaft 48 that is also pivotally mounted as shown. It has an offset crank arm 50 pivotally connected to the end of piston rod 46. The pivotal connections of crank arms 42 and 50 to piston rod 46 are such that horizontal movement of rod 46 causes pivotal movements of turbine-stator members 20 and 24 in opposite directions. This is necessary since the fluid flow is in opposite directions in the parts of the circuit in which the respective blades 32 and 36 are located. For clarity in describing the fluid flow, however, the blades as shown in FIGURE 2 pivot in the same direction.

Piston rod 46 is connected to a piston 52 that is slidably mounted in a cylinder 54. The piston may be actuated by fluid under pressure from any suitable source. For example, the pressure of the operating fluid in the converter can be applied to the side of piston 52 that is nearest the converter, the opposite side being drained through a passage 56. When it is desired to shift or pivot the turbine-stators 20 and 24 to their various positions to be described, fluid can be supplied through a passage 56 at varying pressures. Other suitable control means for moving piston 52 can also be used.

Turbine-stators 20 and 24 are prevented from rotating in a reverse or counterclockwise direction (into the plane of FIGURE 1) by means of a releasable one-way or overrunning brake 58. Shaft 48, and therefore shaft 38, is secured for rotation with the end of a sleeve shaft 60. This latter shaft has an annular boss 62 that is formed as the inner annular race of brake 58. The brake includes an outer annular race 64 spaced from race 62 by a number of spaced rollers or sprags 63. Outer race 64 is adapted to be held stationary at times by a brake band 65 of the fluid pressure actuated, spring released type. When band 65 is engaged, reverse rotation of turbine-stators 20 and 24 and shaft 60 and inner race 62 cause the sprags 63 to move to positions wedging the two races 62 and 64 together, thereby preventing this rotation. Clockwise or forward rotation of the turbine-stators moves the sprags to inoperative positions and thus frees inner race 62 for this rotation. Release of band 65 permits a reverse rotation of race 64 and turbine-stators 20 and 24 to permit the establishment of a reverse drive in a manner to be described.

Shaft 60 is formed at one end with a sun gear 66 that constitutes one element of a planetary gearset 68. The gearset includes intermeshed planet pinion gears 70 and 72 meshing, respectively, with sun gear 66 and a ring gear 74. The ring gear is drivingly connected by a radial flange 76 to a power output shaft 78. The planet pinion gears 70 and 72 are each rotatably mounted on pinion shafts 80 that are fixedly secured in an annular carrier 82. The carrier has an outer axial extension 84 that is adapted to be held stationary at times by a friction brake band 86 to establish either a reverse drive through the gearset, or provide engine braking. Band 86, like band 65, may be of a known fluid pressure actuated, spring released type.

Carrier 82 is normally connected at all times to turbine 22 to be driven thereby. An optional neutral clutch 90, however, is shown, in the event a break in the driveline to carrier 82 is desired. Carrier 82 is splined internally to a number of friction discs 88 between which is located a friction disc 92. Disc 92 is secured to a main drive shaft 94 that is rigidly secured to turbine 22. The neutral clutch 90 may be of a known fluid pressure actuated, spring released type.

The operation of the transmission can best be understood by considering the fluid flow through the converter, as shown in FIGURE 2, simultaneous with the torque flow through the transmission of FIGURE 1. A low speed forward reduction drive is established by conditioning both torque converter 16 and gearset 68 for forward reduction drives by applying band 65, engaging clutch 90, and moving turbine-stators 20 and 24 to the stator positions indicated in FIGURE 2 in full lines. With the vehicle at rest, clockwise rotation of input shaft 10 in the direction of arrow 96 discharges fluid from pump blades 28 in a forward direction against the stationary turbine blades 30. The fluid then passes over blades 30 and is discharged rearwardly against the forward or front sides 98 of turbine-stator blades 32. This causes blades 32 to attempt to rotate in a reverse direction. This, however, is prevented by engagement of one-way brake 58. The fluid is then discharged forwardly from turbine-stator blades 32 against the backs of turbine blades 34 in a manner to attempt to accelerate them forwardly from a position of rest. Fluid discharged rearwardly from blades 34 similarly strikes the front surfaces 98 of stationary turbine-stator blades 36 and attempts to rotate them reversely. The brake 58 thus renders blades 30 and 36 as reaction members, and the fluid discharged from blades 36 is redirected forwardly into pump blades 28 to provide a torque thereto supplemental to the input shaft torque. The converter is now operating in the torque multiplying range.

As soon as the fluid acting against the turbine blades overcomes the resistance to movement of carrier 82, turbines 18 and 22 begin to accelerate and drive carrier 82 forwardly. When the vehicle is stationary, ring gear 74 initially causes pinion gear 70 to attempt to drive sun gear 66 in a counterclockwise or reverse direction. This latter rotation, however, is prevented by the engagement of one-way brake 58. Ring gear 74 is, therefore, forced to rotate clockwise in the same direction as turbine 22, but at a reduced speed.

As the speeds of turbines 18 and 22 increase, the resultant angle of discharge of fluid from their blades 30 and 34 changes progressively from a rearward towards a forward direction. At approximately the coupling point of the converter, when the turbines rotate approximately at the speed of pump 14, fluid discharges from the turbines in a forward direction to strike the back surfaces 100 of turbine-stator blades 32 and 36, and attempts to rotate them forwardly. However, at this time, the reduction drive established in gearset 68 maintains a reverse torque on sun gear 66 of a greater magnitude than the forward rotational torque force applied to the blades of turbine-stator members 20 and 24.

To permit a low gear ratio carry-out, therefore, piston 52 is actuated to move the turbine-stator members to a minimum shock loss position. While this position is not shown, it would be close to the neutral position indicated in dotted lines in FIGURE 2, and is a position in which the fluid inlets of blades 32 and 36 are substantially parallel to the fluid flow path. That is, in order to minimize hydraulic losses at this time to effect a full gear ratio carry-out, the blades 32 and 36 assume a freely floating position providing a minimum shock loss to the fluid entering them from the turbines. For example, fluid pressure can be released from both sides of piston 52, allowing blades 32 and 36 to freely float in the fluid circuit, and seek whatever position is consistent with the fluid flow.

After a passage of sufficient time to obtain the gear ratio carry-out, an upshift from the low speed reduction drive to a hydraulic direct drive is provided by shifting the turbine-stator blades 32 and 36 to the turbine positions indicated in FIGURE 2. This positions blades 32 and 36 to receive the maximum force of the fluid flow to now provide a differential input drive to gearset 68. More specifically, turbines 18 and 22 are now rotating substantially at the speed of pump 18. The fluid now discharged from these turbine blades, therefore, strikes the blades 32 and 36 on their back surfaces 100 substantially at right angles to these surfaces, thereby applying a large forward rotatable force to these blades. This forward rotation unlocks one-way brake 58, and causes a forward rotation of sun gear 66. Thus, both sun gear 66 and carrier 82 are driven forwardly, resulting in a progressive increase in the speed of output shaft 78 to a point where it approaches the speed of pump 14. The transmission is then established in a hydraulic direct drive.

If during direct drive, the speed of shaft 10 should be decelerated, output shaft 78 becomes the driver. The faster forward rotation of shaft 78 would normally cause a forward rotation of sun gear 66 and turbine-stators 20 and 24 without resistance, since brake 58 is ineffective. To prevent freewheeling of the output shaft, band 86 is applied at this time to hold carrier 82 and turbines 22 and 18 stationary. Since blades 32 and 36 are already in the turbine positions, the fluid discharged rearwardly from the stationary turbine blades 30 and 34 strikes the front portions 98 of forwardly rotating blades 32 and 36, and thereby retards their forward motion. The slowing down of blades 36 also progressively increases the backward angle of discharge of fluid from these blades against pump blades 28, which thereby retards the forward rotation of the pump. This results in an engine braking effect due to the retarding of the forward rotation of pump blades 28 against the compression of the engine.

A reverse drive is established by releasing brake band 65, engaging reverse band 86, and positioning the turbine-stator blades 32 and 36 in their turbine positions. The operation is now quite similar to that provided during engine braking, except that the turbine-stator blades 32 and 36 as well as turbine blades 30 and 34 are stationary. Forward rotation of pump 28, therefore, causes a rearward discharge of fluid against the turbine-stator blades causing them to now rotate in a reverse direction to drive sun gear 66 also in a reverse direction. With carrier 82 stationary, the clockwise rotation of pinion gear 70 and counterclockwise rotation of gear 72 drives ring gear 74 and output shaft 78 in a reverse direction, and at a speed reduced from that of shaft 60.

Neutral is established in the transmission in one of two ways. No-drive condition of the grearset can be obtained by disengaging clutch 90, thereby breaking the drive from turbine 22 to carrier 82. A neutral can also be established in converter 16 by rotating the turbine stator blades 32 and 36 in their neutral positions indicated in FIGURE 2. In these positions, the blades are rotated to such a point that the flow of fluid from turbine blades 30 and 34 is effectively blocked from hitting turbine blades 34 and pump blades 28 since the discharge of fluid from blades 32 and 36 is now in such a direction that the fluid will not pass into the inlets of blades 34 and 28. Thus, the circulation of fluid through the converter is prevented, and no torque can be transmitted from pump 14 to turbine 22 and therefrom to the gearset.

From the foregoing, it will be seen that the invention provides a compact two-speed transmission that has an infinitely smooth hydraulic shift from the low speed ratio to a hydraulic direct drive by shifting the turbine-stator members to various operational positions. It will also be seen that by shifting the turbine-stator members to a minimum shock loss position, a more effective low gear stage is provided. It will furthermore be seen that the transmission of torque between input and output shafts can easily be interrupted simply by moving the turbine-stator members to block circulation of fluid through the converter.

While the invention has been illustrated in its preferred embodiment in the figures, it will be clear to those skilled in the arts to which the invention pertains that many changes and modifications may be made thereto without departing from the scope of the invention.

What is claimed is:

1. A transmission having rotatable power input and power output shafts, and means operably connecting said shafts, said means including a hydraulic torque converter and a planetary gearset, said torque converter having a plurality of separately rotatable bladed elements including a pump and a turbine and a turbine-stator element arranged sequentially in the order named and containing fluid for the circulation therein torodially by said pump to said turbine and back again through said turbine-stator element to provide torque multiplying and hydraulic coupling stages of operation, said gearset having a plurality of rotatable members including drive and driven members, a plurality of drive connecting means operatively connecting said input shaft to said pump, said turbine to said drive member, said driven member to said output shaft, and said turbine-stator element to one of said rotatable members, brake means operatively connected to said one rotatable member holding said latter member and turbine-stator element against rotation in one direction to condition said torque converter and gearset each for a reduction drive in the opposite direction therethrough at low speeds of said turbine while permitting rotation of said turbine-stator element and said one rotatable member in the opposite direction at higher speeds of said turbine to effect other drive conditions; means mounting the blades of said turbine-stator element in the flow path of the circulating fluid for swinging pivotal movements between a first fluid essentially non-deflecting position essentially parallel to the path of said fluid and second and third fluid path deflecting positions to opposite sides of said first position whereby the circulating fluid will strike the blades of the next succeeding converter element in a manner urging the said latter element in one direction of rotation or the other as a function of the pivotal movement of said turbine-stator element blades to one side or the other of said first position, and selectively operable force means operatively connected to said turbine-stator element blades for pivoting said blades selectively to said latter positions and to a further position locating said latter blades essentially transverse to said flow path to effectively interrupt the fluid flow to the next succeeding converter element blades thereby establishing a non-drive condition of operation of said transmission.

2. A transmission as described in claim 1, said gearset members including meshed sun and planet pinion and ring gears and a planet pinion carrier, said carrier constituting said drive member, one of said sun and ring gears constituting said one rotatable member, the other of said sun and ring gears constituting said driven member.

3. A transmission as in claim 2, said turbine and turbine-stator element each including interconnected first and second bladed portions, said first and second turbine-stator element bladed portions being positioned, respectively, between said first and second turbine bladed portions and between said second turbine bladed portion and the fluid inlet to said pump, said first turbine bladed portion being located adjacent the fluid exit of said pump.

4. A transmission as in claim 3, said force means including means for simultaneously pivoting said first and second turbine-stator element blades in opposite directions.

References Cited
UNITED STATES PATENTS

| | | | |
|---|---|---|---|
| 2,737,061 | 3/1956 | Kelley | 74—677 |
| 2,855,803 | 10/1958 | Knowles | 74—677 |
| 2,944,402 | 7/1960 | Russell | 60—54 |
| 2,944,441 | 7/1960 | Russell | 74—677 |
| 2,957,370 | 10/1960 | Kelley et al. | 74—677 |
| 2,977,821 | 4/1961 | Gorsky | 74—732 |
| 2,995,955 | 8/1961 | Kelley | 74—677 |
| 2,999,400 | 9/1961 | Kelley | 74—677 X |
| 3,090,252 | 5/1963 | Mamo | 74—677 |
| 3,120,763 | 2/1964 | Shuster | 74—677 X |
| 3,242,677 | 3/1966 | Kelley | 74—677 X |

DONLEY J. STOCKING, *Primary Examiner.*

DAVID J. WILLIAMOWSKY, *Examiner.*

J. R. BENEFIEL, *Assistant Examiner.*